UNITED STATES PATENT OFFICE.

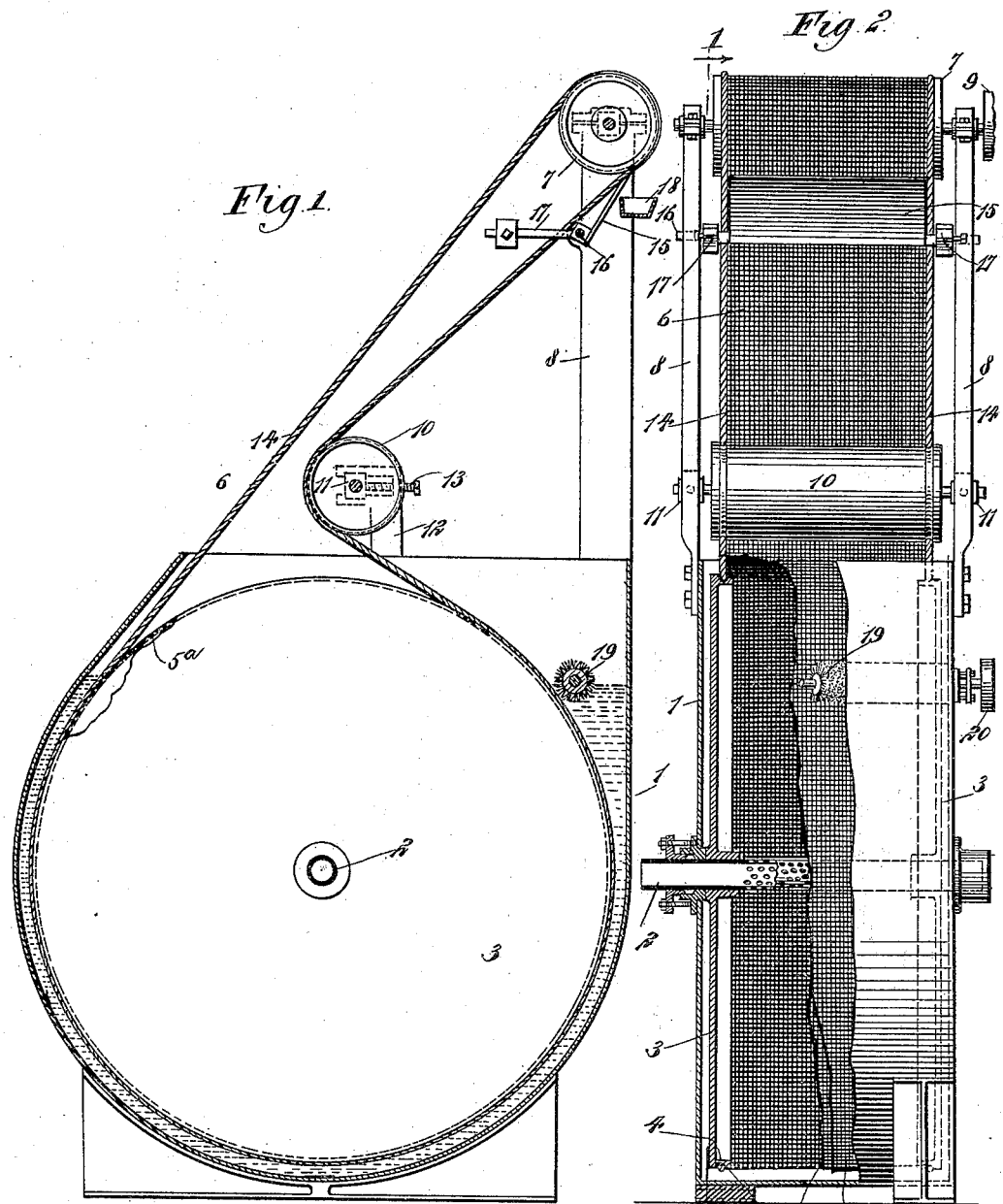

EDGAR LOUIS STREAM, OF NEW ORLEANS, LOUISIANA.

FILTER.

SPECIFICATION forming part of Letters Patent No. 622,561, dated April 4, 1899.

Application filed June 4, 1898. Serial No. 682,593. (No model.)

*To all whom it may concern:*

Be it known that I, EDGAR LOUIS STREAM, of New Orleans, in the parish of Orleans and State of Louisiana, have invented a new and Improved Filter, of which the following is a full, clear, and exact description.

This invention relates to improvements in apparatus for filtering liquids; and the object is to provide an apparatus for this purpose that shall be simple and comparatively inexpensive in its construction and in which a traveling filtering material will be kept clean from sediment, so as not to interrupt the process of filtering.

I will describe a filter embodying my invention and then point out the novel features in the appended claims.

Reference is to be had to the accompanying drawings, forming a part of this specification, in which similar characters of reference indicate corresponding parts in both views.

Figure 1 is a section on the line 1 1 of Fig. 2 of a filter embodying my invention, and Fig. 2 is a partial elevation and partial section thereof.

Referring to the drawings, 1 designates a tank, and 2 is a tubular and perforated shaft having bearings in the side walls of the tank. Mounted on the shaft within the tank are disks 3, each having an inwardly-extended peripheral flange 4, in the outer surface of which is an annular groove 5. The disks are here shown as solid plates, but they may be perforated or formed of gauze or like filtering material without departing from the spirit of my invention. The disks form the side walls of a rotating drum, the periphery or face of which is formed of wire netting or gauze or perforated metal $5^a$, fastened to the rearwardly-extending peripheral flanges of the disks, and thereby supporting an endless apron 6 and also at the same time strengthening the device. The apron 6 extends upward and over a driving-roller 7, having bearings in standards 8, and to which rotary motion may be imparted by any desired means. I have here shown its shaft as provided with a band-pulley 9. Engaging with the apron, below the roller 7, is a tension-roller 10, having its shaft-bearings in blocks 11, mounted to slide in standards 12 toward and from the apron, and the blocks are held as adjusted by screws 13.

With the opposite sides of the apron 6 ropes or cables 14 are engaged. These ropes or cables press the apron into the channels 5 and also into channels formed in the rollers 7 and 10, and thus lateral displacement of the apron is prevented. The ropes or cables have three functions—that is, they serve to relieve the apron from undue strain, and as they project somewhat beyond the surface of the apron they prevent material from running off the edge, and being fastened on top of the filtering-cloth and their tension forcing the cloth into the grooves make a tight joint on the sides of the cloth, thereby preventing liquor from passing into the drum except through the filtering medium.

Engaging with the apron 6 below the roller 7 is a scraper-plate 15, mounted on a rock-shaft 16 and held yieldingly against the apron by weighted arms 17, extended from the rock-shaft. This plate 15 is designed to scrape filter residuum from the apron, and the material so scraped off may fall into and be carried away by a trough 18. To thoroughly clean from the apron any residuum that may escape the scraper, I employ a brush 19, mounted to rotate in the tank 1 and against the apron. As this brush rotates in the liquid in the tank, it is obvious that a washing action will take place against the apron. The brush may be rotated by a band engaging with a band-wheel 20 on the shaft of the brush.

In operation the material to be filtered is poured into the tank 1, and when the filtering material becomes clogged the liquor in the tank will rise to the level of the brush 19. The liquid will filter through the apron and run out through the tubular shaft to a suitable receptacle. During the operation the apron will be slowly moved by power applied to the driving-drum. It is obvious that the scraper and brush will clean the apron of sediment or the like before it passes into the liquid to be filtered.

Having thus described my invention, I claim as new and desire to secure by Letters Patent—

1. A filter, comprising a tank, a tubular perforated shaft therein, disks on said shaft, a face or periphery of perforated material for the drum, an endless apron of filter material having its edges engaged with the disks, a rotary brush engaging with the apron within the tank and means for rotating said apron and disks, substantially as specified.

2. A filter, comprising a tank, a tubular perforated shaft in the tank, disks secured to the shaft within the tank, a perforated material connecting with the disks, an endless apron of filtering material having its edges engaging the disks, a driving-roller above the tank and with which the apron engages, a rotary brush engaging with the apron within the tank and a tension-roller engaging with the apron, substantially as specified.

3. A filter, comprising a tank, a tubular perforated shaft in the tank, disks secured to the shaft and having circumferential channels, a driving-roller, an endless apron of filtering material extending around the roller and disks, and ropes or cables on the apron for engaging in the channels of the disks, substantially as specified.

4. A filter, comprising a tank, a tubular perforated shaft in the tank, disks mounted on the shaft, each of said disks having an annular channel in its periphery, a driving-roller, an endless apron of filtering material extending around the roller and disks, and ropes or cables on the edges of the apron, the said ropes or cables being adapted to engage in the channels of the disks and also being extended outward beyond the plane or surface of the apron, substantially as specified.

5. A filter, comprising a tank, a tubular perforated shaft in the tank, disks on said shaft, a power-roller above the tank, an endless apron of filter material extending around the roller and disks, a scraper engaging with the apron, and a rotary brush engaging with the apron within the tank, substantially as specified.

EDGAR LOUIS STREAM.

Witnesses:
 JNO. C. FINNEY, Jr.,
 JAS. R. ANDERSON.